United States Patent

[11] 3,588,404

| [72] | Inventor | Lloyd T. Akeley<br>Charlestown, N.H. |
|---|---|---|
| [21] | Appl. No. | 823,402 |
| [22] | Filed | May 9, 1969 |
| [45] | Patented | June 28, 1971 |
| [73] | Assignee | Simmonds Precision Products, Inc.<br>Tarrytown, N.Y. |

[54] MAGNETIC FLOAT REED SWITCH POINT SENSOR
5 Claims, 3 Drawing Figs.

| [52] | U.S. Cl. | 200/84 |
|---|---|---|
| [51] | Int. Cl. | H01h 35/18 |
| [50] | Field of Search | 200/84.3, 84, 81.9 (N); 340/244 (A); 73/308 |

[56] References Cited
UNITED STATES PATENTS

| 1,202,757 | 10/1916 | Barnes | 200/84 |
|---|---|---|---|
| 1,682,257 | 8/1928 | Strong | 200/84 |
| 2,448,251 | 8/1948 | Campbell | 200/84.3(UX) |
| 2,810,036 | 10/1957 | Mejean | 200/84 |
| 3,114,478 | 12/1963 | Hickmeier et al. | 200/84.3(UX) |
| 3,389,603 | 6/1968 | Jacobs | 340/244A(UX) |

FOREIGN PATENTS

| 697,701 | 11/1965 | Italy | 200/84 |
|---|---|---|---|

*Primary Examiner*—David Smith, Jr.
*Attorney*—Edwin E. Greigg

ABSTRACT: A float switch for operating a magnetic reed switch utilizing a hollow housing in which the float member is freely movable under the influence of liquid passing through the housing. The float has a magnet within its interior and for a given position within the housing the magnet will energize a reed switch assembly mounted on the exterior of the housing. The housing is installed on the wall of a liquid container by a threaded member extending from one end of the housing.

PATENTED JUN28 1971    3,588,404

INVENTOR
LLOYD T. AKELEY

BY Edwin E. Greigg
ATTORNEY

MAGNETIC FLOAT REED SWITCH POINT SENSOR

This invention relates to level-sensing control switches and more particularly to a float-actuated switch for use with a liquid container wherein installation is effected by means of a simple pipe thread mounting.

Where it is desirable to employ float-actuated switches in liquid containers, it is often the case that several such switches be employed for controlling exterior equipment responsive to different levels of liquid within the container. As a consequence, it often becomes necessary to install such float switches within the container after the same has been constructed in response to new demands created by the system within which the container is used. For this purpose, it is desirable to install such switches externally of the container after the same has been installed and in operating condition. Further, it is desirable that such switches be simple in construction and economical to manufacture, such that they can be replaced as a complete unit. Accordingly, the purpose of this invention is to provide such a switch which is easily installed and can fulfill those requirements as mentioned above, as well as to provide a simple and reliable switch which is economical to manufacture.

It is an object of this invention to provide a float switch utilizing a magnetic float in cooperation with one or more adjustably mounted reed switches.

It is another object of this invention to provide a float switch for use with a liquid container which can be easily installed through a simple pipe thread mounting.

It is yet another object of this invention to provide a float switch utilizing a magnetic float trapped in a dead end housing which is simple in design and reliable in operation.

It is still a further object of this invention to provide a float switch housing which utilizes a float member for cooperating with a magnetic reed switch independent of the installed position of the housing containing the float and which includes a perforated plate damping means for admitting liquid to the interior of the housing.

According to one aspect of this invention there is provided a hollow housing closed at one end and having a pipe thread mounting at its other end for engaging a suitable aperture provided on the sidewall of a liquid container. Within the housing is a float member having a magnet contained therein, the float member having dimensions allowing it to move vertically within the chamber. Mounted on the outside of the chamber and in adjustable relationship therewith is a reed switch which is activated by the magnetic field from the magnet when the latter is at the bottom of the chamber. The reed switch can be rotatably adjusted to any position on the exterior surface of the chamber since the float member with the magnet will always rest on the bottom of the chamber in the absence of liquid in the chamber and regardless of the rotational position of the chamber as a result of its pipe thread fitting into the sidewall of the liquid container.

Other objects and advantages will become apparent from a study of the following specification and drawings, in which.

Figure 1:
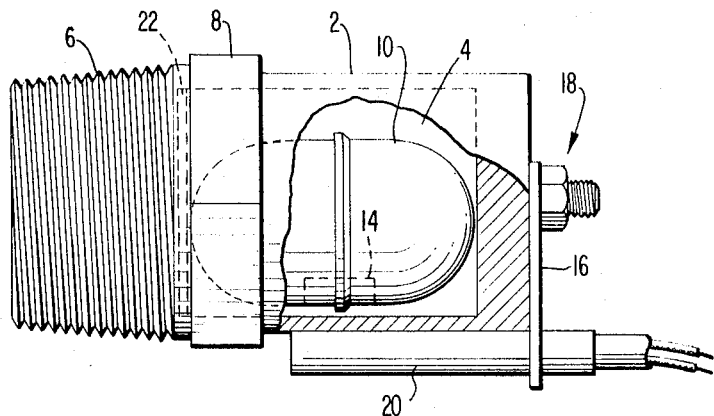
FIG. 1 shows a side elevational view of the float switch constructed according to the principles of this invention.

Referring now to FIG. 1, there is shown a cylindrical chamber 2 having a hollow interior 4 closed at one end and having a pipe thread fitting 6 with preferably an hexagonal base portion 8 disposed at its other end. Within the interior 4 there is positioned a generally cylindrical or spherical float member 10 of conventional design and having a permanent magnet 14 positioned within the interior of the float at the bottom thereof. The magnet may be secured by a suitable cement or the like to the inside surface of the float when the two halves of the float are assembled in a conventional manner. The diametrical dimension of the float is substantially smaller than the diametrical dimension of the interior 4 of the chamber 2 to thereby allow the float to move vertically in response to changing liquid levels within the chamber 4.

Figure 2:
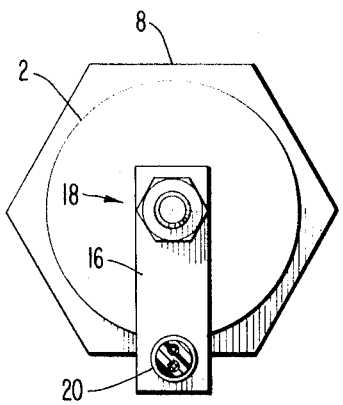
FIG. 2 is a front elevational view of the switch shown in FIG. 1.
Figure 3:
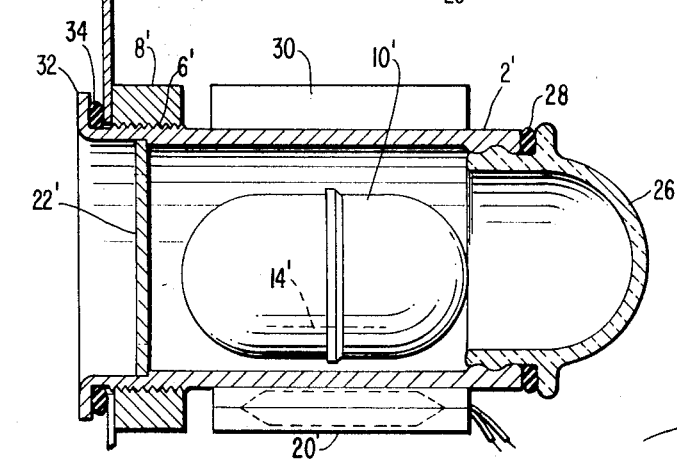
FIG. 3 is a modification of the device shown in FIG. 1.

A bracket 16 is rotatably mounted on a screw 18 extending outwardly from the end wall of the chamber 2. A suitable nut is provided for securing the bracket 16 against the end wall of the chamber 2 in a fixed position. The other extremity of the bracket 16 supports a magnetic reed switch assembly 20 of conventional design which lies along the outside surface of the chamber 2 as shown. As seen in FIG. 2, the magnetic reed switch assembly can be rotated to any position on the outside surface of the chamber 2 by merely rotating the bracket member 16 about the threaded stud 18.

I claim:

1. A float switch assembly for mounting on the vertical wall of a liquid container comprising, a hollow cylindrical housing, a generally cylindrical float member positioned within said housing and dimensioned such as to be freely movable vertically within said housing, said float member having at least one magnet positioned within its interior adjacent the inside surface thereof, said housing being closed at one end and having an open threaded fitting at its other end for mounting in a horizontal position on a vertical wall, at least one magnetic reed switch adjacent the exterior of said housing and adjustable support means for holding said reed switch and adjusting the position thereof about the axis of said cylindrical housing.

2. A float switch assembly as claimed in claim 1, in which said support means are mounted on the closed end of said housing.

3. A float switch assembly as claimed in claim 1, in which said adjustable support means comprises a holder rotatably mounted on and surrounding said housing.

4. A float switch assembly for mounting on the vertical wall of a liquid container comprising, a hollow cylindrical housing, a generally cylindrical float member positioned within said housing and dimensioned such as to be freely movable vertically within said housing, said float member having at least one magnet positioned within its interior adjacent the inside surface thereof, said housing being closed at one end and having an open threaded fitting at its other end for mounting in a horizontal position on a vertical wall, at least one magnetic reed switch adjacent the exterior of said housing, adjustable support means for holding said reed switch and adjusting the position thereof about the axis of said cylindrical housing, and damping means positioned in said threaded fitting for admitting liquid to the interior of said housing.

5. A float switch assembly as claimed in claim 3, in which said housing is closed by a transparent closure means at said one end.